United States Patent [19]

Doninelli

[11] Patent Number: 4,492,035

[45] Date of Patent: Jan. 8, 1985

[54] HEAD PROTRUSION MEASURING STRUCTURE

[75] Inventor: Peter D. Doninelli, Morgan Hill, Calif.

[73] Assignee: Ampex Corporation, Redwood City, Calif.

[21] Appl. No.: 467,629

[22] Filed: Feb. 18, 1983

[51] Int. Cl.³ .............................................. G01B 3/22
[52] U.S. Cl. ................ 33/172 B; 33/148 R; 33/174 Q
[58] Field of Search ............ 33/172 B, 147 L, 148 R, 33/178 R, 174 Q

[56] References Cited

U.S. PATENT DOCUMENTS 2,253,803  8/1941  Newberry ..................... 33/172 B
3,368,283  2/1968  Vasseur ........................ 33/148 R
3,422,540  1/1969  Worthen ....................... 33/148 R

OTHER PUBLICATIONS

Sony Publication BUH-2000 (U/C)/PS/PM; p. 3-3, "Head Tip Projection Check and Upper Drum Replacement".

Primary Examiner—Willis Little
Attorney, Agent, or Firm—Charles M. Carman, Jr.; Joel D. Talcott

[57] ABSTRACT

To measure the protrusion of a magnetic transducing head from a head-supporting and tape-guiding structure of the rotary drum-type, for example, a known gauge means is mounted on a base arranged to ameliorate excessive bearing pressure against the head and damage thereto and to the gauge apparatus.

11 Claims, 5 Drawing Figures

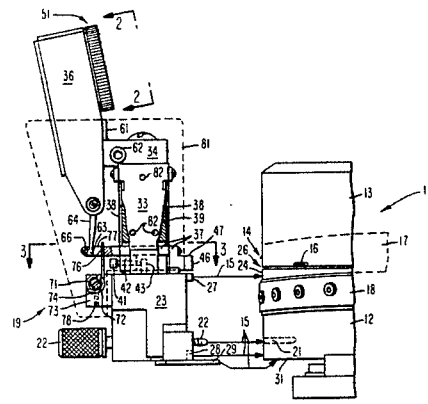

FIG_1

FIG_2

FIG_3   FIG_4   FIG_5

HEAD PROTRUSION MEASURING STRUCTURE

BACKGROUND OF THE INVENTION

This invention relates to measuring means, and particularly to head position gauges in the field of magnetic recording and reproducing.

In so-called helical-scan magnetic tape transducing the heads must protrude just precisely the right distance from the surface of the rotating tape guide drum, in order that the tape stretch in the distorted "tent" in the head vicinity be uniform from head to head and from machine to machine; this is because variations in the degree of stretch cause variations in the wave-length of the recorded signal. But wear and accidental damage in the field can cause variations in the head protrusion, and a good gauge structure that can be used in the field and by relatively untrained operators has long been needed.

Previously known field-type gauges have usually been of the type mounting on some portion of the drum assembly, and must be carefully and precisely brought into engagement with each head in turn, to avoid damage to the delicate and brittle ferrite material of the head; and in some such gauges the head must be protected by means of a thin film or tape of plastic material, which of course introduces some indeterminate error into the measuring process. Such gauge structures usually also embody commercially available gauges of the type having an indicator dial and needle, and a pivoting spring-loaded ball-tipped lever arm for engaging one portion of the object to be measured. Since the ball tip cannot be effectively used in direct engagement with the head, which usually has a sloping surface, an intermediate bearing member must be interposed between the head and ball tip; and the coupling of the ball tip and the bearing member is often of a type that results in damage to the commercial gauge mechanism if the entire structure is dropped or roughly handled. Also, previous bearing members were usually made of steel, into which the hard ferrite material of the head is capable of gouging, at least to the degree that excessive pressure is placed on the more brittle ferrite, causing it to chip or fracture. In exacerbation of this effect, the spring-loading of the commercial gauge mechanism is usually quite strong, to overcome the internal friction and inertia of the gearing or other means that is needed to translate a motion of say one-thousandth of an inch at the head to a more visible movement of the dial-needle tip of about half-an-inch. Thus the bearing force of the ball-tip and bearing member against the head is too great, and fracture or chipping erosion of the head results, particularly at the head gap.

Accordingly, it is an object of the present invention to provide a gauge structure that is easily and accurately usable in the field without damage to a magnetic transducing head, or to the gauge structure itself.

SUMMARY OF THE INVENTION

To measure the protrusion of a magnetic transducing head from the surface of a rotating drum assembly of the type used for supporting and guiding a magnetic tape in a helical path, a gauge structure is provided including a base for engaging a fixed portion of the drum assembly, and a bearing member mounted on the base by means of a parallel-motion linkage for movement generally radially toward and away from the drum assembly so as to bear against the rotating portion of the drum assembly when the head is remote, but against the head when the head is present. A known gauge means is mounted on the base to measure the motion of the bearing member and thus the head protrusion. The base is adapted to bear against only a single generatrix of the drum assembly, so that the diameter of the drum is not a limiting factor in use of the gauge, and it will fit onto any size drum. The inherent spring-loading of the gauge means is arranged to oppose motion of the bearing member toward the drum, and a slightly greater spring loading is provided to urge the bearing member toward the drum, so that the net loading is small. A lost-motion coupling is provided between the bearing member and the gauge means to avoid damage to the latter. The bearing member is made sufficiently wide that no edge thereof can encounter a head, and a ceramic material is used, which is harder and takes a smoother polish, and into which the ferrite head material cannot penetrate.

DESCRIPTION OF THE DRAWINGS

FIG. 1 is a side elevation of the gauge structure of the invention, horizontally displaced from a portion of the rotating magnetic head drum in the zone in which the structure is to fit;

FIG. 2 is a fragmented view of a portion of the apparatus of FIG. 1, taken on the plane of lines 2—2 of FIG. 1;

FIG. 3 is a plan cross-section of the gauge structure of FIG. 1, taken on the plane of lines 3—3 of FIG. 1;

FIG. 4 is a schematic plan view, not to scale, illustrating some of the principles of the structure of FIGS. 1–3; and FIG. 5 is a schematic plan view further illustrating the principles that are illustrated in FIG. 4.

DESCRIPTION OF THE PREFERRED EMBODIMENT

FIG. 1 shows a rotating drum assembly including a fixed drum 12 and a rotating drum 13 for mounting a number of magnetic transducing heads 14, 16 that are intended to make diagonal scanning sweeps across a magnetic tape 17, which is shown only in phantom because it is not present during the head protrusion measuring procedure. A tape edge guide 18 is bolted to the peripheral wall of the fixed drum 12 for guiding the tape in a helical path around the drum assembly.

To assist in securing the gauge structure, shown at 19, a threaded radially directed bore 21 is formed in the fixed drum 12, and a corresponding knurled thumbscrew 22 is slidably retained in the base 23 of the gauge structure 19 for clampingly bolting the structure 19 to the fixed drum 12 whenever it is desired to measure the head protrusion (as illustrated by the arrows 15). The location of the positioning bore 21 is chosen so that a substantial space 24 is available between the tape guide 18 and the gap 26 between the two drums 12, 13, in order to facilitate the engagement of an upper gauge footing 27 of the base 23 of the apparatus 19, the drum surfaces being of course precisely dimensioned cylindrical gauge surfaces for tape guiding. A lower gauge footing 28 is also formed on the base 23 to engage the periphery of drum 12 near its lower edge, and a pair of gauge flanges 29 extend from base 23 to engage the bottom surface 31 of drum 12 to help the operator position the base 23 by feel at the right level for insertion of the thumbscrew 22, and also to ensure that the central plane 30 of the structure 19 (See FIG. 3) is strictly upright so as to include the generatrix of contact 20 of the drum assembly (See FIG. 4).

Above the lower portion of the base 23 rise a pair of spaced columns 33 which are solidly capped at the top by a cross member 34 for mounting the body 36 of a commercially available and well-known gauge means further described below.

Between the two columns 33 is mounted a bearing member 37 for radially directed motion toward and away from drum 13, at the ends of the two thin spring leaves 38, which extend downwardly from the upper portions of columns 33 and define with the columns 33 and the bearing member 37 a parallel-motion linkage for continuous accurate alignment of bearing member 37 in planes radial and normal to the drum assembly. The range of motion of member 37 is limited in part by the engagement of the leaves 38 with an integral central stablizing portion 39 between the columns 33; but the motion of member 37 toward the drum assembly is further and more controllably limited by means of an adjustable set-screw 41 that is threaded through a lower extension 42 of the member 37 and engages a fixed stop pin 43 mounted on base 23.

It will be noted that the heads 14, 16 illustrated in FIG. 1 are angularly offset from one another by about 15 degrees and are axially displaced by about 3/16 inch. There are three such sets of heads angularly spaced around the rotating drum 13 (one set for "record", one for "play" and one for "erase"), and each head has a width (circumferentially) of about 3/16 inch. The protrusion illustrated for head 14, however, is greatly exaggerated for the sake of illustration for in fact this dimension is only about three thousandths of an inch, hardly discernable to the eye. In order to be able to measure the protrusions of both the lower heads (e.g. head 16) and the upper (e.g. head 14), the bearing member 37 is provided with a bearing surface 46 and is dimensioned vertically (i.e. parallel to the contact generatrix 20) for a dimension spanning the axial range of head locations (e.g. the vertical range including heads 14, 16). The face 46 is formed as a gauge face on a bearing piece 47 of hardened polished ceramic (99 percent pure alumina) mounted on the member 37, and when piece 47 is bearing against drum 13, the face 46 and the corresponding gauge faces of footings 27 and 28, are all three precisely co-planar and tangent to the drum assembly 11 at the generatrix 20, as shown in FIG. 4.

A further important relationship is also shown in FIG. 4, which is strictly schematic, the protrusion h of the head (e.g. head 14) being for clarity greatly exaggerated with respect to the radius R of drum 13; and the tangential dimension w of the piece 47 also being exaggerated with respect to the radius R but not so much as the protrusions h of the head. In FIG. 4, head 14 is illustrated as being substantially semi-circular or of arcuate shape in plan view, centered on the cylindrical periphery of the drum 13. When the protrusion of head 14 is to be measured, the drum 13 is roated by hand to displace the head 14 to a so-called "second position" (phantom line) remote from generatrix 20 and not touching the piece 47, which is brought to bear directly against drum 13 at generatrix 20. The indicator dial 51 (FIG. 2) of the gauge means 36 may then be rotated by hand to bring the "zero" mark thereof to the position of the indicator hand 53. The drum 13 is then rotated (counterclockwise as shown in FIG. 4) until the head 14 first makes tangential contact with the face 46 of the bearing member 37. It is important that the dimension w of the ceramic piece 47 be substantially greater than the dimension d representing the range of engagement of the head with the tangent (plane of face 46) to the drum at the generatrix 20. Otherwise, the rectangular edge of the ceramic piece 47 would tend to bite into the highly frangible ferrite material of the head and crack or shatter it. Instead, when the dimension w is substantially equal to or preferably greater than d, the head first encounters ceramic face 46 as a gently inclined surface of slight impact, and damage to the head is avoided. It is within the contemplated scope of the invention to form the face 46 as a cylindrical face of slightly greater radius of curvature than the R of the drum, so as to increase the gentleness of first contact, but the illustrated planar form of face 46 has certain advantages as well. One of these is that, with the face 46 strictly co-planar with the gauge faces of footings 27, 28, the entire structure 19 may be rocked or rolled manually around the drum surface, in effect flexing or bending the thumb-screw 22 and changing the position of generatrix 20, defined as the generatrix of contact, without altering the maximum position of indicator needle 53. This means that the gauge structure is not disadvantageously sensitive to such rocking motion or distortion, and that only two generatrically aligned gauge footings or points of contact (i.e. 27, 28) are needed to align the structure 19 on the drum 12, instead of a minimum of three as is required in the prior art (e.g. two feet spaced circumferentially, and a third spaced axially from the first two). One advantage of this feature is that the invention can more easily be adapted to fit onto a drum assembly of any diameter, whereas the three circumferentially spaced feet of the prior art structures would fit on only one size of drum.

Not all heads have arcuate outlines, but when they do, the dimension d may be more precisely defined as being equal to or greater than $2R\cos(\arcsin((R-h)/R))$.

Referring to FIG. 5, it is to be seen how further counter-clockwise rotation of the drum brings the head 14 to generatrix 20 and moves the piece 47 away from the drum for precisely the dimension h of head protrusion. Of course, one seeks the point of maximum needle displacement.

Referring to FIGS. 1 and 2, the mounting of the commercial gauge means 36, 51 will now be described. The gauge 36 has a dovetail portion 61, which is clasped in a conforming bifurcated portion of element 34, the bifurcations (not shown) being pulled together by means of a clampscrew 62 to clamp the gauge in a chosen position, with the ball-tip portion 63 of the measuring arm 64 at the correct level for engaging a bearing keeper 66 of the member 37.

The gauge means 36, 51, 63, 64 is of a well-known type and the example illustrated is model 7032-3 sold by Brown and Sharpe. The body portion 36 contains various known mechanisms such as levers and gears to provide a mechanical advantage such that movement of the ball-tip 63 in pivoting motion for 0.0001 inch causes movement of the indicator needle 53 for the actual distance shown on the dial, which in FIG. 2, would be about a twentieth of an inch in full scale. Clearly, since the typical head protrusion to be measured is on the order of 0.003 inch of (135 degrees) on the face of the dial 51, a very precise measurement of protrusion can be made. However, one cost of this accuracy is an extreme lethargy, or reluctance to move, inherent in the interior mechanism, so that very heavy spring loading is required within, in order to ensure that the lever arm 64 sensitively follows the contours of the item to be measured. To apply such heavy loads directly against the member 37, and thus against the frail material of the head, risks destruction of the head. Accordingly, the present invention contemplates applying a counter-spring-load to the member 37, so that the net load against the head is very small and within the range of safety.

In principle, the counter-load can be applied either to urge the member 37 away from the head, in which case the counter-load is smaller than the load of the arm 64, or, as in the illustrated apparatus, the gauge 36 is arranged to urge the member 37 away from the head, and the counter-load is applied in a direction toward the head and is greater than the gauge load. The counter-load is applied by means of a coil spring 71 mounted coaxially on a pin 72 which is rotatable in an extension 73 at the outboard side of base 23. One end of the spring 71 is secured to the pin 72, by means of a transverse pin 74, and the other spring end 75 projects upwardly between a pair of bifurcated arms 77, to engage the keeper 66 of a member 37. A screwdriver slot is provided at one end of pin 72, and rotation of the pin serves to change and adjust the loading of the spring 71. When the desired loading is achieved, a set-screw 78 may be tightened to clamp the pin 72 in position.

It will be seen that in this arrangement, if the pin 72 should be jarred and the loading of spring 71 is lost, the apparatus will "fail-safe", with the remaining spring load of gauge 36 applied in a direction away from the head.

As a further protection for the gauge 36, the bifurcated arms 77, and keeper 66, together with the stop means 39 and 41, 43 provide a lost-motion coupling of the arm 64 to the member 37 in such a way as to prevent shocks or damage to the member 37 from moving the ball-tip 63 beyond the range (0.010 inch) defined by the internal stops of the gauge 36.

To protect the entire apparatus from impact damage, a housing including a pair of side plates 81, shown in phantom in FIG. 1, may be mounted as by means of screws (not shown) in threaded holes 82 of members 33.

What is claimed is:

1. For use with a rotating cylindrical guide drum assembly on which is mounted a brittle magnetic transducing head having a safe pressure loading range for engaging a magnetic tape supported by the drum assembly in a helical path, a gauge structure for measuring the radial protrusion of the head from the drum assembly, comprising:
   a base for positioning said gauge structure in predetermined radial relation to said drum assembly;
   a bearing member extending from said base for generally radial motion in first and second directions respectively away from and toward the axis of said drum assembly;
   a gauge means mounted on said base and adapted for urging said bearing member for motion in one of said directions and for providing an indication representing the position of said bearing member with respect to said base; and
   means for urging said member for motion in the other direction opposite to said one direction;
   said urging means and said gauge means being arranged to produce a maximum net pressurizing effect within said safe loading range for urging said member in said second direction toward said axis;
   said generally radially movable bearing member being adapted for radial movement between a first position of tangential engagement with said head in a first position of said head radially aligned with said member, and a second position of said member tangentially engaging said drum assembly, when said head is in a second position circumferentially remote from said member;
   said gauge means being adapted for pressurizing said bearing member for motion in one of said directions from one of said positions thereof toward the other position thereof and for providing an indication representing the distance moved by said bearing member from said one to the other position thereof;
   said urging means including a pin member mounted for axial rotation on said base, a coil spring mounted co-axially on said pin and having extending ends, a first of said ends being secured to said pin and the second of said ends extending to engage and to urge said bearing member in said second direction toward said drum axis, said pin being axially rotatable to variably adjust the urging force of said coil spring, and setscrew means threaded into said base and peripherally engaging said pin to clamp said pin in a chosen position; and
   said urging means and said gauge means being arranged to produce a minimal net pressurizing effect urging said member in the second direction toward said axis.

2. The structure recited in claim 1, wherein:
   said gauge means has a lost motion connection to said bearing means, and stop means are provided for said bearing means in each of said directions of motion thereof to prevent the bearing means moving beyond the range of said lost-motion connection of said gauge means thereto.

3. The structure recited in claim 2, wherein:
   said gauge means includes a dial-and-needle indicator, a body mounting said indicator, a ball-tipped lever mounted on said body for pivoting motion, a means within said body for linking said needle and said lever so that the movement of said needle provides an indication of the pivoting motion of said lever, a pair of stops internal to said body for limiting the range of pivoting motion of said lever, and spring means in said body for loading said lever in said first direction toward a first of said internal stops;
   said bearing stop means and said lost-motion connection being arranged to stop first-direction motion of said bearing member with said lever disengaged from said bearing and stopped by said first internal stop, and to stop second-direction motion of said bearing with said lever disengaged from both of said internal stops.

4. For use with a rotating cylindrical guide drum assembly on which is mounted a magnetic transducing head for engaging a magnetic tape supportable by the drum assembly in a helical path, a gauge structure for measuring the radial protrusion of the head from the drum assembly, comprising:
   a base for positioning said gauge structure in predetermined radial relation to said drum assembly;
   a generally radially movable bearing member extending from said base for tangential engagement with said head in a first position of said head, and with said drum assembly, when said head is in a second position circumferentially remote from said member;

said base having at least one gauge surface adapted for tangential engagement with said drum assembly along only a single predetermined generatrix thereof;

said bearing member having a bearing surface adapted for tangentially engaging said drum assembly at said generatrix thereof in said second position of said head, and for tangentially engaging said head in said first position thereof; and a gauge means mounted on said base and adapted for pressurizing said bearing member for motion in a first direction from one of said positions toward the other position and for providing an indication representing the distance moved by said bearing member from said one to the other position.

5. The structure recited in claim 4, wherein:

said base gauge surface is planar and is adapted for tangential engagement with said drum assembly along said predetermined generatrix thereof;

said bearing member bearing surface is planar and is parallel to said gauge surface for tangentially engaging said drum assembly in said second position and said head in said first position thereof; and said base also has a retaining screw threadable into a fixed portion of said drum assembly at the circumferential location of said predetermined generatrix thereof;

whereby said gauge surface may be clamped into said tangential engagement with said drum assembly at said generatrix.

6. The structure as recited in claim 5, wherein:

said bearing member is surfaced with hardened ceramic at said bearing surface thereof, and is dimensioned parallel to said generatrix for a dimension spanning the axial range of head locations on said drum assembly, and is dimensioned tangentially to said drum assembly for a dimension greater than that of the range of coincidence of said head with the tangential plane of said drum assembly at said predetermined generatrix.

7. The structure recited in claim 5, wherein:

said bearing member is surfaced with hardened ceramic at said bearing surface thereof, and is dimensioned parallel to said generatrix for a dimension spanning the axial range of head locations on said drum assembly, and is dimensioned tangentially to said drum assembly for a dimension equal to or greater than $2R\cos(\arcsin((R-h)/R))$, in which R is the drum radius and h is the radius of an arcuate head centered on the drum periphery.

8. The structure recited in claim 5, wherein:

said bearing member is mounted on said base by means of a parallel motion linkage so as to ensure that the plane of said gauge surface and the plane of the bearing surface remain in parallel throughout the range of motion of said bearing member between said first and second positions.

9. The structure recited in claim 4, wherein:

said base also has means defining a locating and aligning gauge surface for engagement with a mounting surface of said drum assembly normal to the axis thereof.

10. In combination with a rotating cylindrical guide drum assembly on which is mounted a magnetic transducing head for engaging a magnetic tape supported by the drum assembly in a helical path, a gauge structure for measuring the radial protrusion of the head from the drum assembly at a first rotational position of said drum corresponding with maximal radial protrusion of said head in a predetermined axial plane of said drum, comprising:

a base for positioning said gauge structure in predetermined radial relation to said drum assembly;

a generally radially movable bearing member extending from said base for tangential engagement with said head in said predetermined axial plane of said drum when said drum is in said first rotational position, and with said drum assembly, when said drum is in a second rotational position with said head circumferentially remote from said member;

a gauge means mounted on said base and adapted for pressurizing said bearing member for motion in a first direction toward said drum and head and for providing an indication representing the distance moved by said bearing member when said drum moves from one to the other of said positions; and means for pressurizing said member for motion in a second direction opposite to said first direction.

11. A method for employing a gauge structure of the type having a bearing member mounted for motion in a path normal to a planar bearing face of the member and to a planar base surface of the structure for measuring the radial protrusion of a magnetic transducing head from a head-supporting rotary drum assembly therefor, comprising the steps:

bringing said planar base surface of said structure into tangential engagement with a stationary portion of said drum assembly at and only at a generatrix thereof that is circumferentially remote from said head, but with the planar bearing face of said bearing member tangentially engaging the rotating portion of said drum assembly in the path of rotation of said head thereof and also at and only at said generatrix of said assembly;

observing the position of said bearing member with respect to said planar base surface of the gauge structure in the direction of said path of motion of said bearing member;

rotating said rotatable portion of said drum assembly to bring said head into contact with said face of bearing member and to displace said member to the maximum radial extent; and observing the maximum displaced position of said bearing member on said path;

the difference between said observations being a measure of said head protrusion.

* * * * *